(12) United States Patent
Allen et al.

(10) Patent No.: US 7,800,313 B1
(45) Date of Patent: Sep. 21, 2010

(54) MULTI-MODE LED RETROFIT MODULE APPARATUS AND METHOD

(76) Inventors: David M. Allen, P.O. Box 58, Blachly, OR (US) 97412; Kurt Kuhlmann, 820 Canos Creek Cir., San Jose, CA (US) 95136

( * ) Notice: Subject to any disclaimer, the term of this patent is extended or adjusted under 35 U.S.C. 154(b) by 1042 days.

(21) Appl. No.: 11/520,164

(22) Filed: Sep. 12, 2006

(51) Int. Cl.
*H05B 37/00* (2006.01)

(52) U.S. Cl. .................... 315/200 A; 315/209 R

(58) Field of Classification Search ............. 315/200 A, 315/209 R, 225, 241 P, 287, 291, 302, 307; 323/222, 265, 299; 327/175, 514, 515, 540
See application file for complete search history.

(56) References Cited

U.S. PATENT DOCUMENTS

| | | |
|---|---|---|
| 5,349,506 A | 9/1994 | Maglica |
| D363,361 S | 10/1995 | Maglica |
| 6,016,038 A * | 1/2000 | Mueller et al. ............. 315/291 |
| 6,249,089 B1 * | 6/2001 | Bruwer ................... 315/200 A |
| 6,305,818 B1 * | 10/2001 | Lebens et al. ............... 362/184 |
| 6,320,330 B1 * | 11/2001 | Haavisto et al. ............. 315/291 |
| D457,670 S | 5/2002 | Allen |
| 6,953,260 B1 | 10/2005 | Allen |
| 7,015,654 B1 | 3/2006 | Kuhlmann et al. |

OTHER PUBLICATIONS

Opalec Innovative Electronics; catalog web site; Aug. 4, 2005; 6 pages.

* cited by examiner

*Primary Examiner*—Douglas W Owens
*Assistant Examiner*—Jimmy T Vu
(74) *Attorney, Agent, or Firm*—Black Lowe & Graham PLLC

(57) ABSTRACT

A multi-mode LED retrofit module is provided for a flashlight of a type having a serious circuit including a battery power supply, a light bulb, and a single pull, single throw rotary on/off switch. The retrofit module includes a logical control device which measures an on/off time of the rotary switch, subsequent to a previous on-time which is greater than a pre-determined threshold. If the subsequent on/off time is less than a pre-determined threshold (preferably 0.5 seconds), the subsequent short on/off cycle is interpreted as an instruction to change mode.

13 Claims, 4 Drawing Sheets

MULTI-MODE LED RETROFIT MODULE APPARATUS AND METHOD

TECHNICAL FIELD

The invention generally relates to portable illumination devices. More specifically, the invention relates to retrofit LED modules for incandescent bulb, battery operated flashlights.

BACKGROUND OF THE INVENTION

Technology relating to handheld flashlights incorporating a direct current power supply in the form of replaceable batteries and low voltage, incandescent bulbs achieved a technological plateau in the 1970's. Advances in the state of the art typically related to methods of packaging the batteries and bulbs, and reflector designs. In particular, the capabilities of flashlights of this type are strictly limited by inherent characteristics of the incandescent bulb itself. Initially, evacuated bulbs using tungsten filaments enabled power supplies in the range of 1.3V (and more when such batteries are connected in series) to provide varying levels of illumination. So-called halogen bulbs permitted higher filament temperatures increasing the output of such flashlights. Nevertheless, the inherent inefficiency of incandescent bulbs limited the duration of operation of such flashlights to a matter of a few hours or less depending on the number of dry cells provided in the power supply. That is, for increased run time the batteries could be connected in parallel. For increased light intensity the batteries could be connected in series (for increased voltage) but at the expense of run time. In addition, filament bulbs are highly susceptible to mechanical shock, breaking the filament and rendering the flashlight inoperative. In addition, substantial development effort was directed to switch mechanisms for intermittently connecting the direct current power supply to the incandescent bulb so as to render either a more reliable or inexpensive switch, or both.

The assignee of the present invention has significantly developed the state of the art with respect to handheld, battery-operated flashlights and personal lighting devices. One example of the advancements made by the assignee of the present invention is disclosed in U.S. Pat. No. 6,953,260 titled, CONVERTIBLE FLASHLIGHT-HEADLAMP issued on Oct. 11, 2005 the disclosure of which is incorporated herein by reference. That patent discloses a convertible flashlight-headlamp employing a plurality of light-emitting diode semiconductor devices (hereinafter "LEDs"). The LEDs are driven by a microprocessor control unit 154 shown in FIG. 7 of that patent. Further details with respect to the circuitry for driving the convertible flashlight-headlamp shown in the '260 patent is disclosed in U.S. Pat. No. 7,015,054 titled, LIGHT EMITTING DIODE DRIVER CIRCUIT METHOD issued on Mar. 21, 2006 to the assignee of the present invention, the disclosure which is incorporated herein by reference. The method and apparatus disclosed therein provides a sophisticated methodology for driving LEDs with a battery supply voltage below the forward bias voltage of the diode or diode array in use with the circuitry. Being driven by a microprocessor-like device (a microcontroller), the flashlight-headlamp is controlled by momentary contact, multi-function switches. Switches of this type are inexpensive and user friendly in that the momentary depression of a control switch (such as switch 58 in FIG. 3 and FIG. 7 of the '654 patent) cycles the logical control unit through a variety of different modes of flashlight operation (e.g., full power, reduced power, flashing, S.O.S., etc.) The circuitry disclosed in the '260 and '654 patents is also used in other flashlights sold by the assignee herein using a single discoid-type battery, and a single LED in a compact package. However, all the commercial embodiments of flashlights produced by the assignee of the present invention rely on a use of a momentary contact switch which is well adapted for computer control purposes.

In 1984, the Mag Instrument, Inc. introduced a small AA battery flashlight, the Mini Maglite® to the public. That flashlight employed a high quality machined aluminum case incorporating a vented waterproof seal system and a high intensity XENON incandescent bulb as shown in U.S. Pat. No. 5,349,506 titled, MINIATURE FLASHLIGHT issued to Maglica on Sep. 20, 1994. FIG. 1 herein illustrates that prior art flashlight design. Referring to FIG. 1, a miniature flashlight in accordance with the Maglica '506 patent is illustrated in perspective, generally at reference numeral 20. The miniature flashlight 20 is comprised of a generally right circular cylinder, or barrel 21, forming a battery housing and enclosed at a first end by a tail cap 22 and having a head assembly 23 enclosing a second end thereof. The head assembly comprises a head 24 to which is affixed a face or lens retainer cap 25 which retains a lens 26. The head assembly 23 has a diameter greater than that of the barrel 21 and is adapted to pass externally over the exterior of the barrel 21. The barrel 21 may provide a machined handle surface 27 along its axial extent. The tail cap 22 may be configured to include provision for attaching a handling lanyard through a hole 28 in a tab 29 formed therein.

The flashlight described in the '506 prior art patent employs a head assembly 23 which operates a rotary switch mechanism. That is, the flashlight 20 of FIG. 1 encloses two 1.5 volt AA batteries in series with an electrical circuit including a miniature bi-pin lamp bulb 45, the aforementioned batteries, and the barrel 21 as part of the electrical circuit. By rotating the head assembly 23 with respect to the barrel 21, a single pole, single throw electrical switch is opened or closed depending on the direction of rotation. Unfortunately, this type of switch is not directly compatible with the advanced LED circuitry disclosed in the '654 patent to Kuhlmann et al. and the '260 patent to Allen. Nevertheless, those of ordinary skill in the art have recognized the mechanical advantages of the Maglite® flashlight 20 design shown in FIG. 1 as well as the inherent advantages of LED lighting systems with respect to incandescent bulb technology. Therefore, at least one manufacturer operating under the trade name Opalec Innovative Electronics, 7097 Terra Bella Drive, Walnut Creek, Calif., 94596 has provided a multi LED replacement module for use with the Maglite® AA flashlight. The module replaces both the reflector, incandescent bulb and so-called switch assembly (mounting assembly for the incandescent bulb) contained between the head assembly 23 and barrel 21. The resulting modified flashlight otherwise uses all of the original case parts, and batteries of the stock flashlight. The replacement module uses three LEDs to provide a minimally acceptable luminosity and only provides one mode of operation—full power.

Thus, a need exists for an LED retrofit module which provides a multiplicity of modes of operation.

A further need exists for a retrofit LED module for use with a flashlight having a rotary single pole, single throw switch.

A further need exists for an LED replacement module for a maglite-type flashlight capable of driving a high power LED replacement module safely.

SUMMARY OF THE INVENTION

It is therefore an object of the present invention to provide for an LED retrofit module which provides a multiplicity modes of operation.

It is a further object of the present invention to provide for a retrofit LED module for use with a flashlight having a rotary single pole, single throw switch.

It is yet another object of the present invention to provide for a LED replacement module for a maglite-type flashlight capable of driving a high power LED replacement module safely.

The invention achieves the above objects, and other objects and advantages which will become apparent from the description which follows, by providing a method and apparatus for driving a multi-mode LED retrofit module for a flashlight of the type having a series circuit including a battery power supply, a light bulb, and a single pole, single throw on/off switch. The retrofit module includes a logical control device for managing the battery power operating the LED and for measuring and accumulating on time of the switch. The retrofit module also has a non-volatile memory for storing a current mode of the module and a current on-time of the switch. The logical control device determines if the accumulated on-time of a previous on/off cycle is more than a pre-determined threshold. In that case, the logical control device drives the LED at the currently stored mode. If the previous on-time was less than the pre-determined threshold, then the logical control device interprets the immediately previous, short on/off cycle as a command to change modes and drives the LED at an incremented mode.

A method for driving the multi-mode LED retrofit module includes the steps of providing a multi-mode, light emitting diode retrofit module having a logical control device for managing battery power and for operating the LED and a non-volatile memory for storing a current mode and a current on-time of the switch in the series circuit. The module is turned on by closing a single pole, single throw (e.g., rotary) switch. A mode of the module is stored in non-volatile memory. The on-time of the switch is measured and accumulated in the memory. The rotary switch is turned off and the accumulated on-time of the switch is stored. The switch is turned on again and it is determined if the previously accumulated on-time is more than a pre-determined threshold, in which case, the logical control device drives the LED in the currently stored mode. In the alternative, if the previously accumulated on-time is less than the pre-determined threshold, the logical control device drives the LED at an incremented mode.

In preferred embodiments of the invention, the logical control device is a microcontroller having a non-volatile memory. A capacitor can be provided in parallel with the battery power supply to power the logical control device when the switch is off for a brief period of time. The multiple modes of the retrofit module may include at least three modes corresponding to full power, one-quarter power, and one-sixteenth power.

DETAILED DESCRIPTION OF THE PREFERRED EMBODIMENTS

Figure 1:
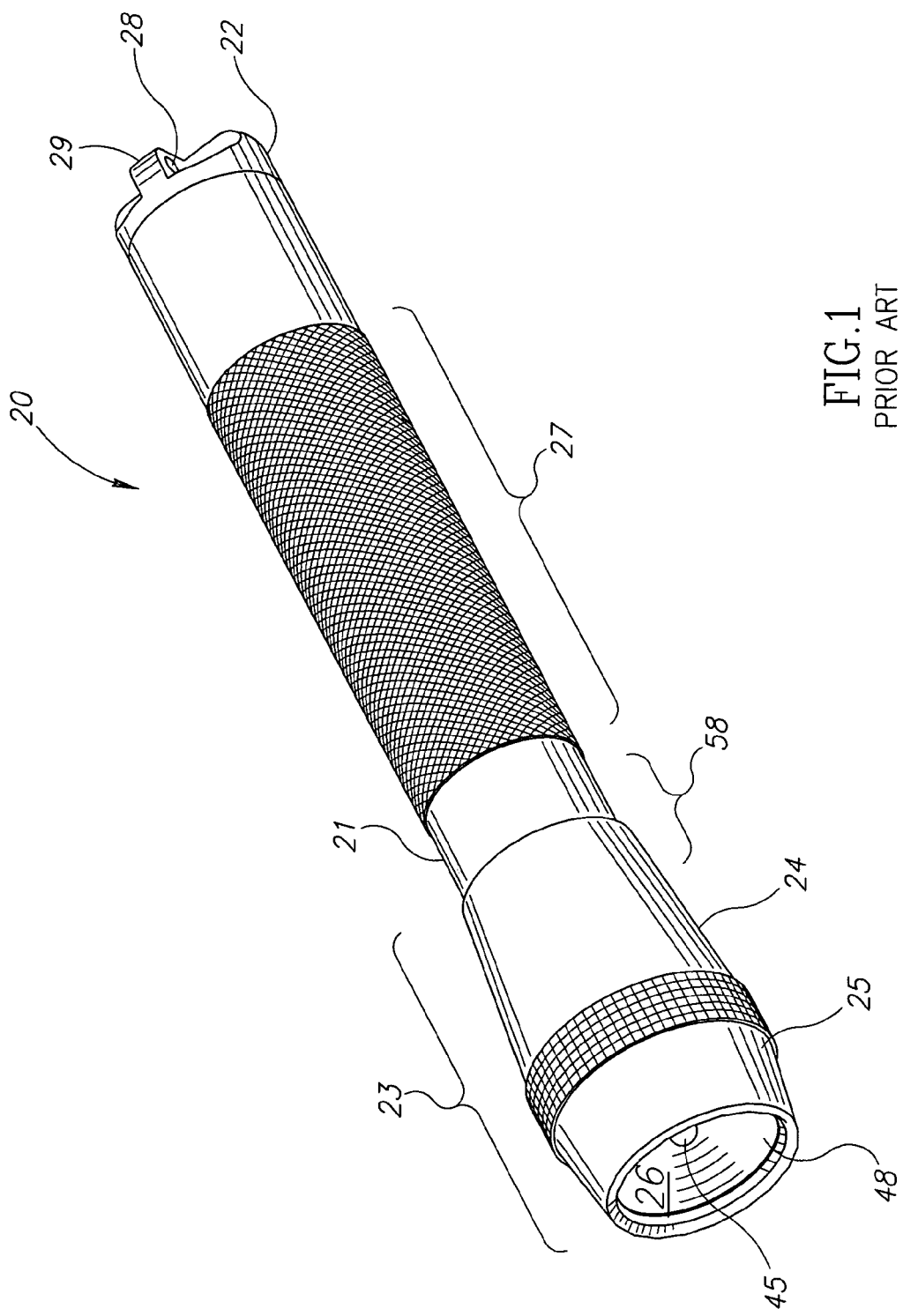
FIG. 1 is a perspective view of a prior art AA-type Maglite® flashlight employing a rotary single pole, single throw on off switch.
Figure 2:
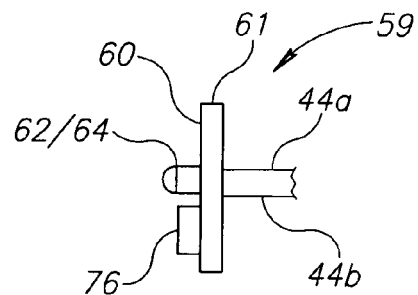
FIG. 2 is a side-elevational view of a LED replacement module for the flashlight shown in FIG. 1.

A multi-mode LED retrofit module in accordance with the principles of the invention is generally indicated at reference numeral 59 in FIG. 2 of the attached drawings wherein numbered elements in the Figures correspond to like numbered elements herein. The LED replacement module 59 replaces the incandescent bulb 45 (and if necessary, any mounting assembly or the like within the prior art flashlight) so as to provide the flashlight 20 shown in FIG. 1 with a multi-mode LED lighting system. The module includes first and second electrical contacts 44a and 44b which may be mechanically interchangeable with conducting pins on the miniature bulb 45 of the prior art flashlight 20. The retrofit module 59 includes a light-emitting device driver circuit 60 preferably mounted on a substrate 61. The substrate also supports the electrical contacts 44a and 44b, as well as an LED array 62, or single high powered LED 64.

Figure 3:
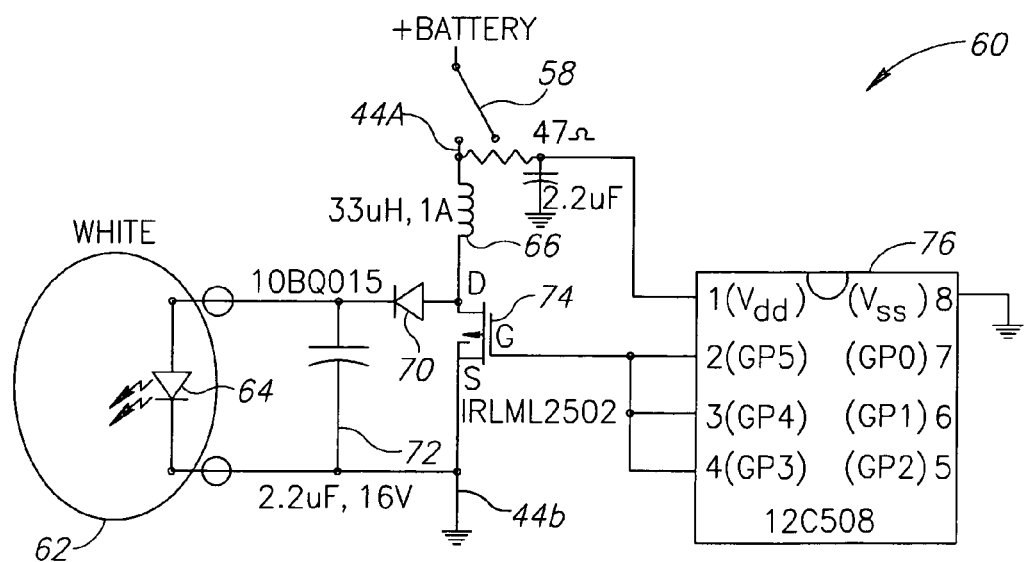
FIG. 3 is a electronic schematic of a first embodiment of the LED replacement module shown in FIG. 2.

A first embodiment of a light emitting device driver circuit is generally indicated at reference numeral 60 in FIG. 3. The circuit includes a light emitting diode array 62 consisting of a single, individual LED 64. The preferred light emitting diode is manufactured by Nichia having a white light output and a forward bias voltage of 3.6V per diode. The AA power supply within the flashlight 20 can only supply at best its nominal voltage of 3.0V. Therefore, circuit 60 includes a conventional boost circuit consisting of a 33 μH inductor 66 rated at 1 A in series with a Schottky diode 70 having a 0.1V forward bias voltage in series with a 2.2 μF smoothing capacitor 72. The LED 62/64 is in parallel with the smoothing capacitor in the conventional boost converter circuit configuration. A first switch 74, preferably in the form of a depletion mode, n-channel field effect transistor (hereinafter "FET") is provided to selectively connect the inductor 66 to ground so as to permit the power supply to charge the inductor when the gate of the FET is energized. The drain of the FET 74 is connected to an output of the inductor 66 and the anode of the diode 70. The source of the FET 74 is connected to the ground 44b. The high side of the inductor 66 is connected to the positive power supply 44a. The gate of the FET 74 is connected to pins 2, 3, and 4 of a logic control device 76 preferably in the form of an 8-bit programmable micro-controller manufactured by Microchip, Chandler, Ariz., USA. An appropriate model number PIC 12C508 has 8 pins numbered in the conventional manner. As stated above, the gate of the FET 74 is connected to pins 2, 3, and 4 of that micro-controller (general purpose pins 5, 4, and 3) in the preferred embodiment. Pin 1 is connected to the positive power supply 44a while pin 8 is connected to ground 44b. Pins 5, 6 and are allowed to float, or may be connected through a power supply RC spike filter 7 to ground. The general purpose pins (physical pins 2-7) of the micro-controller 76 are of the tristatable type, that is, these pins can be used as outputs (driven at CMOS logical high or low) or can be used as input pins which float like open circuits and can be intermittently connected through internal pull-up resistors to ground the supply voltage so that voltages can be measured at those pins. The circuit 60 advantageously employs the multistate characteristic of these pins to turn the FET switch 76 on and off so that the inductor 66 can be alternately charged and discharged, and at certain preselected periods during this charge/discharge cycle convert general purpose pins 5, 4, and 3 (physical pins 2, 3, and 4) to inputs for measuring voltage in an RC timing circuit comprising the natural gate capacitance of the FET switch 74 connected to battery voltage through an internal pull-up resistance of the micro-controller. It is well known to those of ordinary skill in the art that all field effect transistors (and the base of junction transistors as well) have an inherent capacitance with respect to ground. Gate capacitance is a known and fixed characteristic of the geometry and chemistry of the field effect transistor which is provided by the manufacturer. In addition, the internal resistance of the microcontroller is also known and supplied by the manufacturer. The microcontroller is also capable of sensing at its general purpose pins when a threshold voltage (typically the CMOS threshold voltage of 1.2V) is achieved at any of the general purpose pins when the pins are used as inputs. Thus, at an appropriate time the micro-controller 76 applies the power supply voltage through its internal resistance to the gate of the FET 74 and then measures the amount of time it takes for the gate capacitance to reach the threshold voltage. The gate capacitance and internal resistance being fixed, this time to threshold voltage is proportional to the ability of the power supply to charge the inductor. Shorter times represents strong batteries. Longer times represents weak batteries. In the preferred embodiment, a time period of 11 μsec represents strong batteries, whereas a measured time of 31 μsec represents weak batteries. Although the RC curve is exponential, the initial part of the curve below 1.2V is surprisingly linear such that the micro-controller 76 preferably increases the turn-on time of the FET by a proportionate amount to generate a larger magnetic field in the inductor 66 during a charge cycle. In this manner, a substantially constant current can be supplied for the LED array 62 regardless of the actual, instantaneous voltage of the battery supply available at external electrical contacts 44a and 44b. This is the case even whereas here in the preferred embodiment, the nominal battery voltage is significantly below the forward bias voltage of the LED array 62. In addition, the received transition time through the pre-selected threshold voltage of 1.2 volt is measured while the battery supply is under load and thus is a more accurate representation of the ability of the power supply to energize the inductor 66.

In contrast to the prior art circuit shown in FIG. 3 of U.S. Pat. No. 7,015,654, the momentary contact, multi-function switch 58 is replaced with the single pole, single throw switch 58 of the Maglite® flashlight 20 shown in FIG. 1. In order to communicate with the logic control device 76, a method is provided for user input as to the desired mode of flashlight operation. As set forth in the Background of the Invention section hereinabove, the prior art multi-mode flashlight-headlamp cycled through a variety of different modes by interpreting sequential depression of the momentary contact switch 58 as an instruction to change modes. As will be appreciated by those of ordinary skill in the art, the rotary on/off switch of the prior art Maglite®-type flashlight 20 shown in FIG. 1 is not amenable to rapid sequential, momentary, repeated on/off switching to indicate a mode change. Therefore, the applicant herein has developed a method of interpreting a specific on/off cycling of the rotary switch 58 as indication to change operational modes in an incremental fashion depending on whether or not the switch is turned on and left on for a significant time period, or whether the switch is turned on and off within a time period less than a predetermined threshold, followed by a long on time.

Figure 5:
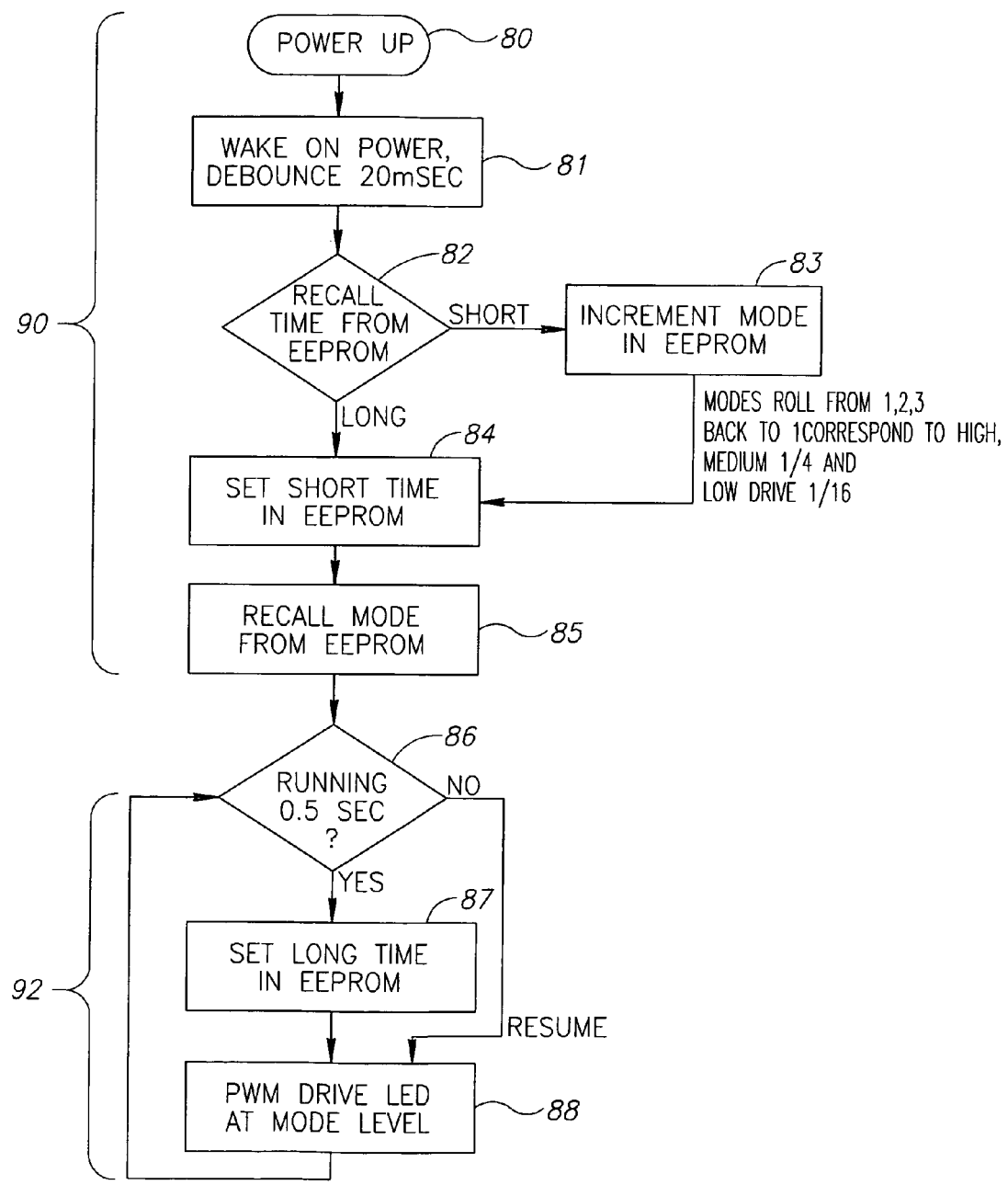
FIG. 5 is a logical flowchart illustrating a method of use of the invention.

As best seen in FIG. 5, the logic control device 76 follows a predetermined program when the circuit 60 is powered up at 80 and the switch 58 is debounced at action box 81 when the rotary on/off switch 58 is turned on by rotating the head assembly 23, counterclockwise with respect to the barrel 21. A previous on-time is recalled at decision box 82 from erasable electronic programmable read only memory (EE PROM) in logic control device 76. If the previous on-time was less than a pre-determined interval or threshold (preferably 0.5 seconds), then the current mode of the LED drive circuit 60 is incremented at action box 83 to the next mode and that mode is stored in EE PROM. If the previous on-time recalled from the EE PROM at 82 is greater than the pre-determined threshold, then the mode is not incremented and a short time flag is set at 84 in the EE PROM. The mode is then recalled at 85 from the EE PROM. If the flashlight has been running for more than the pre-determined threshold as indicated at decision box 86, then a long time flag is set at action box 87 and the drive circuit 60 drives the LED array 62 or LED 64 through pulse with modulation at the current mode level as shown at action box 88. If the flashlight has not been running for more than 0.5 seconds, then the long time flag is not set in EE PROM at action box 87 and the LED is driven at the current mode shown in action box 88.

Thus, the logic flow describe in FIG. 5 can be described as having a first component 90 and a second component 92. With two components together, it is determined whether the flashlight has previously been turned on for a long time indicating that a mode change is not desired by the user or, whether the flashlight has been turned on for less than 0.5 second, turned off and then turned back on in which case that activity is interpreted as a command to change modes. In this way, the full functionality of the multi-mode LED driver circuit shown in FIG. 60 can be used with a single throw single contact switch 58 such as employed in the Maglite® flashlight 20 shown in FIG. 1.

Figure 4:
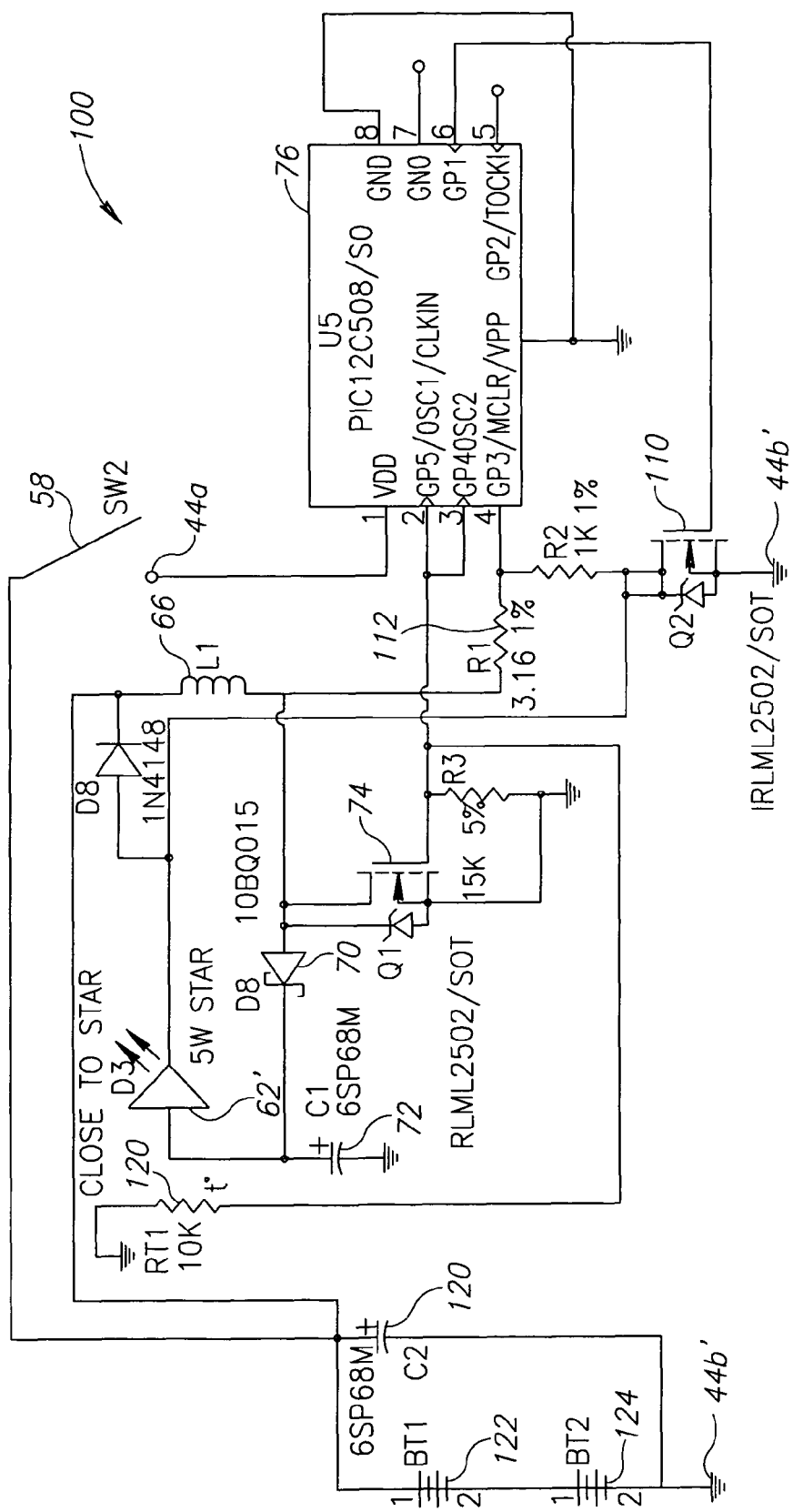
FIG. 4 is an electronic schematic of a second embodiment of an electronic circuit for use with the LED replacement module shown in FIG. 2.

An alternate embodiment of the LED driver circuit 60 is shown in FIG. 4 generally indicated at reference number 100 utilizing a single high power LED 62'. In this embodiment, the essential characteristics of the circuit shown in FIG. 3 are used differently to determined the ability of the power supply (available at external electrical contacts 44a and 44b) to charge the inductor 66.

In this alternate embodiment, the light emitting device driver circuit 100 has been modified so that the circuitry is easily adaptable to a variety of different power supplies and/or light emitting devices. In this embodiment the diode array 62 (or single LED 64) has been replaced with a single, very bright white light emitting diode 62' having an approximate 5 watt output at 6.5 volts forward bias and 700 mA. The power supply available at terminals 44a' and 44b' consists of two 1.5 volt AA batteries having a nominal power supply of approximately 3 volts. An appropriate gallium arsenide LED 62' is available from Lumileds, San Jose, Calif., U.S.A. under the brand name Luxeon Star. In this second embodiment, the 3 volt nominal voltage of the power supply is not very close to the 6.5 forward bias voltage of the diode 62'. In this second embodiment, a second switch 110 in the form a field effect transistor and a voltage divider consisting of first and second resistors 112, 114 are positioned in series between the inductor 66 and the ground 44b'. The second switch is preferably a field effect transistor having its gate controlled by general pin 1 (physical pin 6) of the micro-controller 76. Rather than measuring the voltage on the gate capacitance of the first switch 74 during the period of essentially no current flow from the inductor as with respect to the first embodiment, the micro-controller 76 now measures the actual flyback period. The first and second resistors 112, 114 of the voltage divider are used to drop the voltage appearing at the bottom of the inductor 66 to approximately the threshold voltage level (approximately 1.2 volts) of the CMOS circuitry of the micro-controller 76 at general purpose pin 3 (physical pin 4). As with the first embodiment, general purpose pin 3 is directed by the micro-controller 76 to merely sense the voltage across the second resistor 114 when the FET of the second switch 110 is turned on to sample the divided inductor 66 voltage. A measurement of this flyback period is made approximately once every 8 charge/discharge cycles 80/82. The voltage across the second resistor 114 will cross the approximate 1.2 volt threshold level sensed by the micro-controller 76 at the end of a flyback period when the inductor begins to "ring" about the supply voltage. In the second embodiment with the selected component values, a ratio of resistance between the first and second resistors 112, 114 of approximately 2 to 1 will drop the battery supply voltage (i.e., the average inductor ringing voltage) below the pre-selected voltage threshold. A typical flyback period for the selected component values will be approximately 10 microseconds. This indicates a strong power supply. For every microsecond of variation in the flyback period from this typical value, the inductor charging period 118 is incremented or decremented by 1 microsecond so as to maintain a substantially constant current flow to the LED 62'.

As will be apparent to those of ordinary skill in the art, if the nominal battery supply voltage is substantially changed the ratio of the first resistor 112 to the second resistor 114 can be appropriately changed so that the battery supply voltage through the inductor is dropped by the appropriate amount below the CMOS threshold value which can be sensed by the micro-controller 76 when sampled through the second FET 110. Thus, no change with respect to the micro-controller 76 programming is necessary.

Use of the light emitting diode 62' introduces additional concerns which must be addressed for safety reasons. Principally, when the LED 62' is operating at full power (i.e., 5 watts) the LED becomes very hot. If left in an insulated environment (e.g., a garment pocket) the LED 62' will self destruct at a temperature of approximately 150° C. and pose a fire hazard (normal operating temperature of the LED 62' is approximately 50° C.-70° C.). In order to monitor the temperature of LED 62' a thermistor 120 is placed in close physical proximity to the LED 62' and is connected between ground and the gate of the first FET switch 74 in parallel with the internal resistance of the micro-controller 76. Thus, the RC time constant apparent at the gate of the first FET switch 74 is now variable and dependent upon the negative temperature coefficient of the thermistor 120. That is, as the thermistor becomes heated by the LED 62' the RC time constant measured by the micro-controller 76 changes. In this manner, general purpose pins 5 and 4 of the micro-controller 76 (physical pins 2 and 3) are intermittently sampled in a fashion similar to that explained with respect to the first embodiment 60 such that the pins are driven in one of the tri-states to apply the supply voltage to the gate of the first FET switch 74 to charge up the gate capacitance. The pins are then turned off and switched to input mode allowing the gate capacitance to discharge through the thermistor. The micro-controller 76 now measures the time it takes for the voltage across the thermistor 120 to drop below the CMOS threshold of 1.2 volts. If the time period is small (i.e., too fast) the thermistor (and hence the LED 62') is hot. The micro-controller 76 then turns off the second and first switch 110, 74 preventing current flow through the LED 62'. Additional safety factors taken into consideration include the extremely high intensity of the LED 62' which can be blinding if focused in the eyes of a user if the power supply is at full capacity. To eliminate this possibility, in this second embodiment the micro-controller 76 supplies current to the diode 62' with a slow ramp. The 8-bit counter of the micro-controller 76 produces 256 charge and discharge cycles which are repeated. In this ramp-up mode, the LED 62' is only initially illuminated for one cycle of the first 256 cycles. Thereafter the LED 62' is illuminated for 2 cycles, 3 cycles, etc. of each 256-cycle period. During each of these initial discharge cycles, the flyback period is measured as described above to provide an indication of power supply strength. If the power supply is not powerful enough, then the maximum current drawn and supplied to the LEDs is limited so as not to overdraw the supply and collapse its voltage, causing erratic system resets.

Those of ordinary skill in the art will conceive of other alternate embodiments of the invention upon reviewing this disclosure. Thus, the invention is not to be limited to the above description, but is to be determined in scope by the claims which follow.

The invention claimed is:

1. A method for driving a multi-mode LED retrofit module for a flashlight of the type having a series circuit including a battery power supply, a light bulb and a rotary single pole, single throw on/off switch, comprising:
    removing the light bulb;
    inserting a multi-mode, light emitting diode (LED) retrofit module in the flashlight, the module having a logical control device for managing battery power and for operating the LED;
    recalling in association with the logical control device an immediately previous stored on time of the switch; and,
    determining, in association with the logical control device if the previous on time is more than a predetermined threshold in which case the logical control device drives the LED at a current mode and,
    if the previous on time is less than the predetermined threshold the logical control device drives the LED at an incremented mode.

2. The method of claim 1, including the steps of storing the current mode and a current on time in non-volatile memory of the logic control device.

3. The method of claim 2, wherein the logical control device is a micro-controller.

4. The method of claim 2, including the step of providing the retrofit module with a power supply capacitor which provides power to the logical control device when the switch is off.

5. The method of claim 1, including the step of resetting and storing a logical short time flag in non-volatile memory of the logical control device indicative of the module having been in a power on condition less than the predetermined threshold when the module is powered on by the switch if the module was last powered on for more than the predetermined threshold.

6. The method of claim 1, wherein the module has at least three modes corresponding to full power, one-quarter full power, and one-sixteenth full power.

7. The method of claim 1, wherein the threshold is approximately 0.5 seconds.

8. A method for driving a multi-mode LED retrofit module for a flashlight having a series circuit including a battery power supply, a light bulb and a single pole, single throw on/off switch, comprising:

providing a multi-mode, light emitting diode (LED) retrofit module having a logical control device for managing battery power and for operating the LED and a non-volatile memory for storing a current mode and a current on time of the switch in the series circuit of the flashlight in place of the light bulb;

turning on the switch;

storing a mode of the module in non-volatile memory;

measuring and accumulating an on time of the switch;

turning off the switch and storing the accumulated on time in the non-volatile memory;

turning the switch on again;

determining in association with the logical control device if the accumulated on time is more than a predetermined threshold in which case the logical control device drives the LED at the currently stored mode; and, determining in association with the logical control device if the accumulated on time is less than the predetermined threshold in which case the logical control device drives the LED at an incremented mode.

9. The method of claim 8, wherein the logical control device is a micro-controller.

10. The method of claim 8, including the step of providing the retrofit module with a power supply capacitor which provides power to the logical control device when the switch is off.

11. A multi-mode LED retrofit module for a flashlight of the type having a series circuit including a battery power supply, a light bulb and a rotary single pole, single throw on/off switch, comprising:

a logical control device for managing battery power, operating the LED and for measuring and accumulating on time of the switch;

a non-volatile memory for storing a current mode of the module and a current on time of the switch; and, means for determining if the accumulated on time is more than a predetermined threshold in which case the logical control device drives the LED at the currently stored mode, and if the accumulated on time is less than the predetermined threshold in which case the logical control device drives the LED at an incremented mode.

12. The retrofit module of claim 11, wherein the logical control device is a micro-controller.

13. A multi-mode, light emitting diode (LED) flashlight, comprising:

a battery power supply, a rotary, single pole, single throw on/off switch; and, a multi-mode LED module in electrical series with the power supply and the switch, the module having a logical control device for managing battery power, operating the LED and for measuring and accumulating on time of the switch, a non-volatile memory for storing a current mode of the module and a current on time of the switch, means for determining if the accumulated on time is more than a predetermined threshold in which case the logical control device drives the LED at the currently stored mode, and if the accumulated on time is less than the predetermined threshold in which case the logical control device drives the LED at an incremented mode.

* * * * *